UNITED STATES PATENT OFFICE.

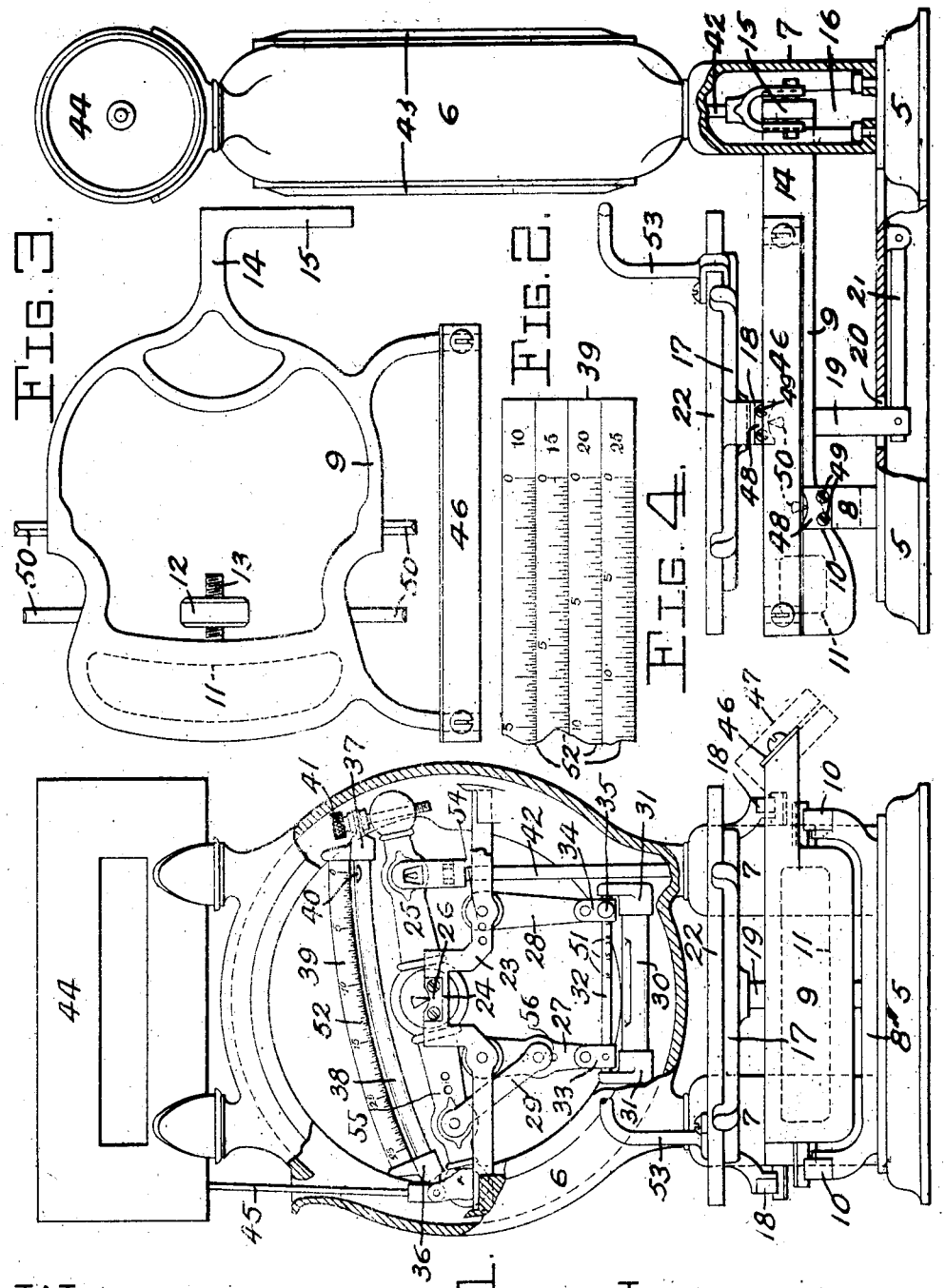

AVILA GAUVIN, OF MONTREAL, QUEBEC, CANADA.

AUTOMATIC WEIGHING-SCALE.

999,365. Specification of Letters Patent. Patented Aug. 1, 1911.

Application filed February 14, 1910. Serial No. 543,841.

*To all whom it may concern:*

Be it known that I, AVILA GAUVIN, of the city of Montreal, in the Province of Quebec and Dominion of Canada, have invented certain new and useful Improvements in Automatic Weighing-Scales, of which the following is a full, clear, and exact description.

This invention relates to improvements in automatic weighing scales, and the main object is to provide means whereby the scale will come quickly to balance without the necessity of shifting the counterpoise.

A further object is to provide a weight indicating mechanism for the scale which cannot be tampered with.

A still further object is to provide means whereby the scale may be adjusted for more accurately weighing small weights.

To accomplish these objects, I provide a framework carrying a suitably arranged depressible platform connected to a pivoted beam, which is in turn connected to one of two levers carrying the counterpoise. An adjusting device is provided whereby the other may be made to carry more or less of the weight of the counterpoise so as to make the scale more or less sensitive. A curved glass tube having a bubble therein, passing under a suitably graduated scale, indicates the weight on the platform.

In the drawings which illustrate my invention:—Figure 1 is a front elevation of the device. Fig. 2 is a side elevation. Fig. 3 is a plan view of the platform lever. Fig. 4 is a view of a portion of the weight indicating scale.

In the above defined figures, 5 designates a suitably shaped base, and 6 the inclosing case of the weighing mechanism which is supported on the base by a pair of hollow legs 7. A yoke 8 is fixed to the front end of the base and pivotally supports the platform lever 9 at the bearings 10. This lever 9 is substantially of the shape shown in Figs. 2 and 3, and is provided at the front with a hollow portion 11 which may be loaded when assembling the scale. A weight 12 is provided mounted on a threaded post 13 projecting toward the rear of the lever 9 for more accurately adjusting the balance of the scale. The tail 14 of the lever 9 is provided with an arm 15 extending at an angle thereto, and entering one of the legs 7 through a slot 16 therein. A platform support 17 is pivotally supported on the platform lever 9 by a bearing 18 located to the rear of the bearings 10. This platform support is maintained horizontal by means of a central post 19 depending therefrom and passing through an aperture 20 in the base 5. The lower end of the post is pivoted to one end of a link 21, the opposite end of which is pivoted to the base. This support 17 may be flat, as shown, and adapted to support a platform 22, or may be curved to support a scoop-pan, such as is used by grocers.

A framework 23 is located diametrically across the case 6, and is raised at its center 24 where the beam 25 is supported on a bearing 26. Pivoted to the framework 23 at each side of the raised portion 24 are depending levers 27 and 28, the former of which, 27, is connected to the beam by a link 29 which is pivotally mounted at each end. The counterpoise is in the form of a tube 30, preferably of glass, containing some suitable liquid. The tube 30 is mounted between caps 31 which are connected by a small rod 32. A pair of blocks 33 and 34 are mounted on this rod 32 and pivotally connected to the levers 27 and 28, respectively, the block 33 being fixed on the rod and the block 34 being longitudinally adjustable thereon by means of a small set screw 35. At the ends of the beam 25 are caps 36 and 37, somewhat similar to the caps 33 and 34, which support between them a curved glass tube 38 and a curved scale 39 above the tube. The tube 38 contains a suitable liquid in which a small bubble 40 is left, such as is seen in a spirit level, and this bubble moving in the tube, as the beam tilts, indicates weights on the scale 39. The cap 36 is preferably hinged to the beam, while the cap 37 is mounted on the beam by means of a set screw 41, so that the tube 38 may be readily adjusted to the beam. The opposite arm of the beam from the link 29 is connected to the arm 15 of the platform lever by a rod 42, which passes down through one of the hollow legs 7. The front and back of the case 6 are formed of thick glass plates 43, which effectually protect the mechanism and through which the same may be readily seen by both customer and vender. Any suitable cost computing and indicating device 44 may be mounted above the case 6 and operated by a rod 45, pivotally connected to the opposite end of the beam from the rod 42. To multiply the capacity of the scale, I provide on one side of the platform lever 9 a bar 46 adapted to support a weight 47. Wherever possible throughout the device, I prefer to use the well known knife edge in all bearings, as this bearing reduces friction to a minimum. Wherever practicable, these bearings are in the form of a small block 48 of polished marble, or other suitable material, attached to the metal parts of the scale by screws 49. The blocks 48 are preferably provided with a wide shallow groove for the reception of the knife edge 50, as shown in Fig. 2.

When the weight 47 is placed on the front end of the bar 46, it tends to raise the tail of the lever 9, and thus compensates for any additional weight over the capacity of the scale in the well known manner. The weight 47 may also be placed very close to the pivotal point 10 and used as a "tare" weight when goods are weighed in containers. To render the scale more sensitive so that small weights may be more accurately gaged, to the fraction of a pound, I provide graduations 51 on the rod 32, each indicating a limit of capacity for the scale. Corresponding with the graduations 51, I provide series of graduations 52 on the scale 39, which will divide the same length of scale into fewer and therefore larger divisions for each pound or fraction thereof.

The operation of the device is simple and it will be easily understood that articles placed on the platform 22 depress the same so that the lever 9 is depressed to tilt the beam 25 through the medium of the rod 42. As the beam 25 moves, it carries the lever 27 with it by reason of the connecting link 29. As the counterpoise 30 is raised on the end of the lever 27, it is also moved to one side so that, as it rises, more of its weight depends from the beam 25 through the link 29. In this way the counterpoise is automatically adjusted to balance the weight on the platform. When the beam 25 tilts, the bubble 40 in the tube 38 seeks the highest point of the tube and indicates on the scale 39 the weight on the platform. When it is desired to render the scale more sensitive, the block 34 is moved on the rod 32, toward the center of the counterpoise and locked by the screw 35. As shown in Fig. 1, the weight of the counterpoise is equally divided between the levers 27 and 28 but if the block 34 is shifted, say to graduation "10," most of the weight of the counterpoise is on the lever 28 so that comparatively little force need be applied to the lever 27 to raise the counterpoise. When the device is thus adjusted to weigh only ten pounds, the graduations on the scale 39, dividing the same into ten parts, are used. As each division is larger, the bubble 40 will indicate the weight more accurately. A guard rail 53 may be attached to the platform to protect the glass face of the case from breakage or soiling. When it is desired to make the above described adjustment permanent the upper end of the lever 28 may be shifted to one of the pivot apertures 54 in the support 23. If the capacity requires still further reduction the link 29 may be shifted nearer the center of the beam and pivoted in the apertures 55, the lower end of the link being necessarily shifted to corresponding apertures 56 in the lever 27.

The use of a liquid in the counterpoise tube prevents the jars and vibrations that would be caused by a solid weight and allows the scale to come to a balance more rapidly.

Having thus described my invention, what I claim is:—

1. In a weighing scale, a scale beam, a platform, means connecting the scale beam and platform, a counterpoise, a pair of levers suspending the counterpoise below the scale beam, and a link connecting the scale beam and one of said levers.

2. In a weighing scale, a scale beam, a platform, means connecting the scale beam and platform, a counterpoise, comprising a tube, a liquid content therefor, and a tube holder, a pair of levers suspending the counterpoise below the scale beam, and a link connecting the scale beam and one of said levers.

3. In a weighing scale, a scale beam, a platform, means connecting the scale beam and platform, a counterpoise comprising a liquid containing tube and holder therefor, means suspending the counterpoise below the scale beam, a link between the scale beam and said suspending means, a curved transparent tube superposed on the scale beam having a bubble therein, and a graduated scale above said tube.

4. In a weighing scale, a scale beam, a platform, means connecting the scale beam and platform, a counterpoise comprising a tube, a liquid content therefor, and a tube holder, a pair of levers suspending the counterpoise below the scale beam, a link connecting the scale beam and one of said levers, a curved transparent tube superposed on the scale beam containing a liquid having a small bubble therein, and a correspondingly curved graduated scale above said tube.

5. In a weighing scale, a scale beam, a platform, means connecting the scale beam and platform, a counterpoise, comprising a tube, a liquid content therefor, and a tube holder, a pair of levers suspending the counterpoise below the scale beam, a link connecting the scale beam and one of said levers, and means for adjusting the second of said levers on the tube holder to render the scale more sensitive.

6. In a weighing scale, a scale beam, a platform, means connecting the scale beam and platform, a counterpoise comprising a tube, a liquid content therefor, and a tube holder, a pair of levers suspending the counterpoise below the scale beam, a link connecting the scale beam and one of said levers, a curved transparent tube superposed on the scale beam containing a liquid having a small bubble therein, a correspondingly curved graduated scale above said tube, and means for adjusting the second of said levers on the tube holder to render the scale more sensitive.

7. In a weighing scale, a frame work, a scale beam pivotally mounted therein, a platform supported on the framework, means connecting the platform and scale beam, a counterpoise comprising a tube, a liquid content therefor, and a tube holder, a pair of levers suspending the counterpoise below the scale beam, a link connecting one of said levers and the scale beam, means for adjusting the other lever on the tube holder to regulate the capacity of the scale, a curved transparent tube superposed on the scale beam, a liquid content for said curved tube having a small bubble therein, a correspondingly curved graduated scale above the tube, and means for adjusting the tube and scale to the scale beam.

In witness whereof I have hereunto set my hand in the presence of two witnesses.

AVILA GAUVIN.

Witnesses:
STUART R. W. ALLEN,
E. R. McKENZIE.